SOLID STATE LIGHT SOURCES

Filed Aug. 21, 1967

INVENTOR.
Robert J. Robinson
BY John J. Pederson
Attorney

3,496,429
SOLID STATE LIGHT SOURCES

Robert J. Robinson, Park Ridge, Ill., assignor to Zenith Radio Corporation, Chicago, Ill.

Filed Aug. 21, 1967, Ser. No. 661,866
Int. Cl. H01l 3/00, 5/00
U.S. Cl. 317—237 25 Claims

ABSTRACT OF THE DISCLOSURE

Efficient visible light emission at room temperatures and at wavelengths throughout all portions of the visible spectrum is achieved by minority carrier injection across a p-n junction in semiconductor diodes formed of hybrid solid solutions of III*a*–V*a* and II*b*–VI*a* compounds. Spontaneous emission and stimulated emission operation of such diodes are described.

BACKGROUND OF THE INVENTION

This invention relates to solid state light sources and especially, although not exclusively, to semiconductor-diode light sources for producing visible light by p-n junction luminescence.

In the recent past there has been considerable experimental research and a great deal of theorizing relating to the use of semiconductor diodes as sources of light emission for use, for example, in such applications as image display devices for use in television receivers or the like. Such a light source comprises a monocrystal or polycrystal of semiconductor material containing a p-n junction comprising contiguous n-doped and p-doped regions. Upon the injection of minority charge carriers by forward biasing the junction, certain semiconductor materials have been observed to produce spontaneous light emission by radiative recombination of electrons and holes in the neighborhood of the junction. The wavelength of the emitted light is dependent upon the energy band properties of the semiconductive material and the energy levels of the impurity atoms used as dopants, and upon the type of radiative transition (i.e., conduction band to acceptor, donor to valence band, or donor to acceptor) which predominates.

While many anticipated applications of p-n junction luminescence require the emission of light radiation in the visible part of the spectrum, the number of semiconductor materials having band gap energies sufficiently high to qualify as visible light emitters is extremely limited. Visible light emission by recombination of carriers in the vicinity of a forward-biased p-n junction has thus far been demonstrated at room temperature with only silicon carbide, gallium phosphide, and mixed crystals of gallium phosphide and gallium arsenide.

Silicon carbide with a band gap energy of 2.86 electron volts at room temperature has been used to produce visible light emission by injection luminescence across a forward-biased p-n junction, but the obtainable room temperature efficiencies with this material are so low—in the order of $10^{-2}$ to $10^{-3}$ percent—as to render it completely impractical for most if not all contemplated applications. Moreover, to obtain visible light emission at the short-wavelength end of the visible spectrum, i.e., 4000 angstrom units, photon emission corresponding to more than three electron volts is required and accordingly such visible emission is not obtainable from a forward-biased p-n junction (even at impractically low efficiencies) with silicon carbide.

Most of the recent experimental efforts reported in the literature have been concentrated in studies of semiconductor diodes fabricated of III*a*–V*a* semiconductor compounds and particularly gallium arsenide (GaAs), gallium phosphide (GaP), and solid solutions or alloys of these materials identified as GaAs–GaP or $GaAs_xP_{1-x}$. The energy gap of GaAs is not sufficiently wide to produce visible light emission. Visible light has been produced with GaP injection diodes at room temperature with external quantum efficiencies as high as 1 or 2 percent, but only at the extreme red end of the spectrum; efficient photon emission at wavelengths below the red portion of the visible spectrum by forward bias of a p-n junction is not attainable in GaP. Spontaneous emission of visible light has also been produced with GaAs–GaP, but such emission is limited to the red-to-green wavelengths at ordinary room temperatures, and then only at extremely low efficiencies of the order of $5\times10^{-2}\%$.

Certain of the II–VI compounds have sufficiently wide band gap energies but can only be prepared with high conductivity in one conductivity type (either n-type or p-type) and therefore do not permit the formation of efficient p-n junctions.

Various techniques and expedients have been investigated and are still being investigated in an effort to produce spontaneous emission of visible light despite the limitations imposed by the band gap properties of available materials in which p-n junctions can be formed. For example, heterojunctions of two chemically different materials, one n-type and the other p-type, have been considered and experimentally evaluated, but in all cases the observed quantum efficiencies have been very low, much below 1% even at cryogenic or liquid nitrogen temperatures. The use of external magnetic fields or externally applied pressures have also been considered and explored, in an effort to reduce the wavelength of emitted portions from materials whose band gap energy is not sufficiently broad to yield visible emission directly, but these approaches have not only failed to provide improved efficiencies but introduce undesirable structural complexity and have failed to yield emission at the short-wavelength end of the visible spectrum. Other configurations involving reverse-biased metal-semiconductor contacts or the insertion of an insulating film between the metal contact and the semiconductor, as well as devices employing tunnel injection or avalanche multiplication, have been considered, but the highest external quantum efficiencies obtained have still been in the order of one or two percent and this only at liquid nitrogen temperatures or below.

It is a principal object of the present invention to provide a new and improved semiconductor diode light source.

An additional object is to provide a visible light semiconductor diode light source operable with practical efficiency at room temperature.

It is a further important object of the invention to provide an efficient p-n junction luminescence semiconductor light source for producing visible light emission by radiative transitions within the band gap of the material employed.

It is a further object of the invention to produce a semiconductor diode light source for producing light emission at shorter wavelengths than heretofore obtainable with semiconductor materials.

Still a further and extremely important object of the invention is to provide a new and improved p-n junction luminescence visible light source operable at room temperatures at energy conversion efficiencies substantially higher than those heretofore obtained with semiconductor diodes.

Also, it has been reported that stimulated emission of coherent light has been achieved in a number of direct-gap semiconductor materials, but room temperature lasting in the visible range has not been achieved with semiconductor materials at any wavelength, and the only visible light semiconductor injection lasers which have been demonstrated are those made from gallium arsenide-gallium phosphide solid solutions which are operable only at or below liquid nitrogen temperature (77° K.) and are limited by the energy band gap properties to the long-wavelength or red-to-orange portion of the visible spectrum. Considerable work has also been done on infrared semiconductor injection lasers such as gallium arsenide lasers, and differential external efficiencies up to 70% have been observed at liquid nitrogen temperature and up to 20% at room temperature, but the band gap in gallium arsenide is too narrow to permit operation in the visible range.

Yet another object of the invention is to provide a new and improved semiconductor injection laser.

An additional object is to provide a visible light semiconductor injection laser operable at room temperatures.

Still a further object of the invention is to provide a semiconductor injection laser for producing coherent light emission at visible wavelengths not herefore obtainable with such devices.

Reference may be made to an article entitled "Semiconductor-Diode Light Sources" by M. R. Lorenz and M. H. Pilkuhn, IEEE Spectrum, April 1967, pages 87–96, for a current review of the state of the art; this article and the references cited therein are incorporated herein by reference for that purpose.

SUMMARY OF THE INVENTION

In accordance with the invention, a new and improved semiconductor light source comprises a crystalline semiconductive base composed of a hybrid solid solution of II*b*–VI*a* and III*a*–V*a* compounds, and asymmetrically conductive means for injecting minority charge carriers into the base.

While the invention concerns materials which are semiconductors by nature, more particularly the II*b*–VI*a* and III*a*–V*a* compound semiconductors, these materials are widely referred to in the semiconductor technology as simply III–V and II–VI compounds. Accordingly, the simplified nomenclature is adopted throughout the ensuing description, it being understood that the II–VI and III–V materials referred to are more particularly II*b*–VI*a* and III*a*–V*a* compounds. Similarly, references to Group II, Group III and Group VI elements, conforming with conventional terminology in the semiconductor field, are used to identify Group II*b*, Group III*a* and Group VI*a* atoms respectively.

BRIEF DESCRIPTION OF THE DRAWINGS

The features of the present invention which are believed to be novel are set forth with particularity in the appended claims. The construction and operation of the invention, together with further objects and advantages thereof, may best be understood by reference to the following detailed description in conjunction with the accompanying drawing, in which:

DESCRIPTION OF THE PREFERRED EMBODIMENTS

Figure 1:
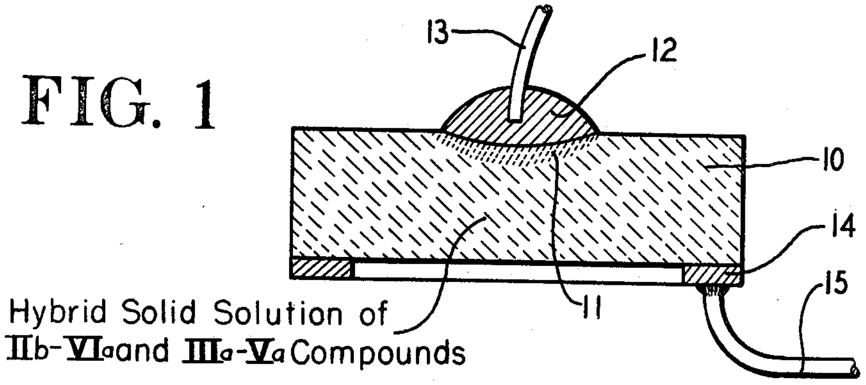
FIGURE 1 is a schematic cross-sectional view of a semiconductor diode light source embodying the present invention.

The invention is based in part upon an important discovery that the properties of the II–VI compounds with respect to the probability of radiative or non-radiative transitions are significantly different from those of known semiconductor-diode light source materials. More particularly, although the II–VI compounds such as zinc sulfide, cadmium sulfide, and alloys or solid solutions of the two, exhibit generally longer radiative-recombination lifetimes (and hence smaller radiative transition probabilities) than the III–V compounds such as gallium arsenide, gallium phosphide, or solid solutions of the two, the probabilities of non-radiative transitions are smaller to an even greater degree, with the result that the II–VI materials are characterized by considerably higher internal quantum efficiencies. This characteristic of the II–VI compounds is particularly pronounced with respect to donor- or conduction band-to-deep-acceptor transitions. Moreover, and of extreme importance, the high internal quantum efficiency of the II–VI compounds is attainable even at room temperature.

Unfortunately, Group II–VI compounds such as zinc sulfide, zinc selenide, cadmium sulfide and zinc telluride whose band gaps are sufficiently wide to produce visible light emission in response to electron beam or optical excitation are not amendable to chemical doping to provide a p-n junction. Indeed, zinc sulfide, which exhibits the widest energy gap of any material in the group, exhibits a strong preference for the well compensated state; it has been impossible to produce high p-type conductivity in zinc sulfide, and even n-conductivity has been obtained only with great difficulty and with impractically high resistivity. Accordingly, at least at the present state of the art, it has not been possible to make p-n junctions in wide-band gap II–VI compound semiconductors, and for this reason it has not been possible to determine whether injection electroluminescene can be achieved in such materials.

In its broad aspect, the invention contemplates the provision of a crystallographically homogeneous continuum of semiconductor material of which only a portion is of p-type conductivity, at least the p-conductivity portion being composed of a p-doped hybrid solid solution of one or more II–VI compounds with another constituents comprising a compound of a Group III metal, the latter constituent most desirably being a III–V compound. Means are provided for effecting electron-hole recombination in a part of the continuum other than the p-conductivity portion; such additional means may most desirably comprise a forward-biased p-n junction formed between the p-conductivity portion and a contiguous n-conductivity portion of the continuum. Efficient p-type conductivity is most desirably achieved by acceptor impurity doping which involves diffusion of Group II metal atoms for Group III atoms in the lattice structure of the continuum.

More particularly, it has been found that crystalline semiconductive solid solutions or alloys of one or more II–VI compounds with one or more III–V compounds retain those properties which favor highly efficient visible light emission at room temperatures while also being amenable to chemical doping to produce both n and p conductivity types so that a p-n junction can be formed. In particular, such alloys or solid solutions within a broad range of constituent proportions exhibit the high internal quantum efficiencies, the relatively slow relaxation or decay times, and the relatively broad-band emission spectra which are characteristic of the II–VI compounds. Alloys embodying the invention are amenable to chemical doping with either donor or acceptor impurities to provide either n-type or p-type conductivity, Group VI or Group II atoms being usable respectively as donor and acceptor impurities. Preferably, shallow donor and acceptor impurities are employed to obtain low-resistivity n-type and p-type zones, and a deep acceptor impurity is also provided as an activator so that spontaneous emission achieved is substantially less than band-to-band, thus favoring light production at normal room temperatures; the shallow donor impurity may also serve as the compensating co-activator, or a separate compensating co-activator impurity may be employed.

In most instances, the hybrid solid solutions of II–VI and III–V compounds are true mixed crystals of the zincblende lattice configuration. The wide-band-gap III–V compounds, namely gallium arsenide, aluminum phosphide and gallium phosphide, preferred for use in accordance with the invention, are of the zincblende crystal lattice structure, and the wide-band-gap II–VI compounds—notably zinc sulfide and cadmium sulfide as well as zinc telluride and zinc selenide—also exhibit the zincblende crystal lattice structure, although the II–VI compounds can also be formed with a hexagonal lattice configuration. As a general rule, mixed-crystal solid solutions of III–V and II–VI compounds of the zincblende lattice structure can be formed throughout a wide range of proportions of the constituent compounds if the lattice constants do not differ by more than approximately 10%, and in this event a true mixed crystal also of zincblende lattice structure is formed. However it has also been found that III–V semiconductor compounds of zincblende lattice structure are soluble to a very limited extent in II–VI compounds of hexagonal configuration; solid solutions of this type become saturated at very low concentrations of the III–V compound, so that in effect what is produced is really a III–V-doped II–VI hexagonal lattice structure. In either event, atoms of all elemental constituents of the II–VI and III–V ingredients enter into the resultant crystal lattice, and the hybrid material thus formed can be rendered either n-type or p-type by doping with appropriate donor or acceptor impurities respectively. Both the true mixed crystals of zincblende lattice structure and the hexagonal-lattice hybrid materials are useful in making semiconductor diode light sources in accordance with the present invention, and unless otherwise specified in particular context, the term "solid solution" and the term "alloy," as used in the specification and in the appended claims, are employed as generic terms descriptive of either type of hybrid material. The term "mixed crystal" is employed to denote a solid solution of isomorphous II–VI and III–V semiconductor compounds of the zincblende lattice structure, and the term "hexagonal-lattice hybrid material" to denote the III–V-doped II–VI matrix.

The wavelength and hence the color of the light emission from a given hybrid solid solution is dependent upon the constituent proportions of the II–VI and III–V compounds, throughout a broad range of such proportions. In general, it is found that p-n junctions can be formed even in solid solutions having one mole percent or even less of the III–V constituent. Typically, the II–VI constituent will exhibit a wider band gap energy than the III–V component of the solid solution, and as the proportion of III–V constituent is increased, the band gap energy of the alloy is correspondingly reduced until, on reduction of the II–VI constituent below a minimum amount which is typically in the range of about five to ten mole percent, room temperature luminescence is no longer obtainable.

Control of the wavelength of the emitted photons in a semiconductor diode light source embodying the present invention may be provided in either of two ways. The relative proportions of the III–V and the II–VI compound ingredients may be varied to establish the band gap and hence the wavelength of the radiative transitions as desired, within the limitations imposed by the band gap properties of the starting materials. On the other hand, to obtain optimum efficiency while providing for visible light emission at different wavelengths throughout the visible spectrum, it may be preferred to employ ternary hybrid materials composed of a pair of II–VI compounds and a single III–V compound, with the III–V compound being included in only a minimum amount sufficient to permit the production of a p-n junction, the wavelength of the photon emission being dependent upon the relative proportions of the II–VI compounds in the ternary matrix. Thus, for example, hybrid solid solutions of different relative amounts of zinc sulfide and cadmium sulfide, with either gallium phosphide or gallium arsenide present in concentrations of 1 mole percent or less but more than conventional doping concentrations, may be employed to produce semiconductor diode light sources emitting light at each of the primary colors red, blue and green for use in developing a color picture from a color television broadcast transmission. The relative proportions of zinc sulfide and cadmium sulfide required to provide photons of the desired primary colors may be analogous to those employed in production of the cathodoluminescent phosphors for producing light output at the corresponding primary colors.

Also in accordance with the invention, it has been found that much greater efficiencies at room temperature are obtainable with deep-defect emission than by any band-to-band or nearly band-to-band transition. Certain deep level activator impurities, e.g., silver or copper in proportions of the order of several parts per million, have been found to strongly inhibit non-radiative transitions, and the inclusion of such activators in the crystalline hybrid materials of the present invention favors radiative recombination of minority and majority carriers and yields internal quantum efficiencies approaching 100% at ordinary room temperatures. Moreover, semiconductor diode light sources embodying the invention may exhibit room temperature energy conversion efficiencies of from one to several orders of magnitude higher than those previously attained. Energy conversion efficiencies in the range from 1 to 20% or even higher at any visible light wavelength, as contrasted with efficiencies of the order of .05% typical of the prior art visible light room temperature recombination light sources, may be obtained with forward-biased p-n junctions in the hybrid material according to the present invention.

It has been found that a hybrid alloy or solid solution of II–VI and III–V compounds in accordance with the present invention exhibits marked photoluminescence under ultraviolet illumination or X-radiation when the concentration of the II–VI compound in the alloy is at least five to ten mole percent or more. Moreover, the photoluminescent hybrid material may be rendered highly conducting in either n-type or p-type conductivity by chemical doping with appropriate donor or acceptor impurity atoms.

A spontaneous emission semiconductor light source embodying the invention is shown in FIGURE 1. The device comprises a crystalline semiconductive base 10 composed of a hybrid solid solution of one or more II–VI compounds such as zinc sulfide or cadmium sulfide and one or more III–V compounds such as gallium phosphide or gallium arsenide. The base monocrystal or polycrystal 10 includes a donor impurity, such as diffused sulfur or selenium, and is of n-type conductivity. A small central portion of the upper surface of the monocrystalline or polycrystalline base 10 is doped as by diffusion of a Group II metal such as zinc which substitutes for Group III metal atoms in the hybrid crystal lattice to form a p-type conductivity zone 11 to which an ohmic contact 12 and a conductive lead 13 are attached. An ohmic contact 14, preferably in the form of an annular electrode contacting the opposite surface of crystalline base 10, is provided with a connecting lead 15 to establish a connection to the n-conductive side of the p-n junction. For operation in the spontaneous emission mode, the light intensity is substantially proportional to the forward-bias current through the p-n junction between n zone 10 and p zone 11 for current densities up to the order of 100 amperes per square centimeter for steady-state or D.C. operation; if the size of the junction is $5\times10^{-4}$ square centimeter, for example, D.C. injection currents up to 50 milliamperes may be employed. For pulsed or signal-responsive operation, much higher peak injection currents may be accommodated. Light emission in the spontaneous emission mode is omnidirectional and of a wavelength dependent upon the specific composition and proportions of the constituents of the hybrid solid solution of which semiconductive base 10 is composed.

The mechanism by which effective donor and acceptor impurity doping is achieved in a hybrid solid solution of II–VI and III–V compounds is not fully understood, but it has been observed that most effective doping with resulting optimum conductivity is usually achieved by employing donor and acceptor impurity atoms of elements appearing in the basic lattice structure of the solid solution. Thus, in a hybrid alloy such as zinc sulfide and gallium phosphide (ZnS–GaP), acceptor doping may be effectively attained by the diffusion of zinc atoms in the lattice, apparently to replace gallium, while n-type conductivity may be attained by doping with donor atoms of sulfur which apparently replace phosphorus atoms in the crystal lattice. Acceptable results may also be attained, however, by doping with homologs of the atomic constituents of the hybrid lattice (i.e., by doping a ZnS–GaP alloy with cadmium or a CdS–GaAs alloy with zinc to form p-type conductivity), and it is also possible that acceptable results may be obtained in some hybrid compositions by doping with Group IV elements such as germanium or silicon. In any event, it has been found that impurity doping of the hybrid alloy by substitution of Group II and Group VI atoms for the Group III and Group V atomic constituents respectively is readily attainable and suffices to impart p-type or n-type conductivity, respectively, to the entire hybrid lattice.

The hybrid crystals useful in semiconductor light sources of the present invention may be produced in any of a number of ways, such as by precipitation from the liquid phase at high temperatures, by halide transport vapor deposition in a closed capsule, or by epitaxial crystal growth processes. In general, any known techniques useful in the growth of semiconductor crystals may be useful in fabricating the materials employed in the light sources of the present invention, although the results attained with each particular composition are subject to empirical optimization. The particulars of several illustrative processes will now be set forth.

P-n junctions have been formed and p-n junction luminescence by spontaneous visible photon emission on deep level radiative recombination of electron-hole pairs has been achieved with the use of a ZnS–GaP alloy prepared and processed in the following manner. 0.1704 gram of zinc sulfide powder and 0.0305 gram of sulfur-doped gallium phosphide were mixed carefully and placed in a quartz capsule. 5.0001 grams of elemental gallium was added above the ZnS–GaP mixture, and a quartz rod proportioned to fit snugly within the capsule was inserted to confine the ingredients to the smallest possible volume. The capsule was then evacuated to a pressure of $6.4\times10^{-6}$ millimeters of mercury, sealed off, and baked for six hours at a temperature of 925° C., after which the furnace was permitted to cool to room temperature over a 16-hour period. The capsule was opened and the excess elemental gallium removed from the crystals formed within the quartz capsule by mechanical agitation and boiling in distilled water. The residual crystals were of a nominal composition of 15 mole percent gallium phosphide and 85 mole percent zinc sulfide, with zincblende lattice structure, having n-type conductivity (100 ohm-centimeter resistivity) attributable to the sulfur doping of the original gallium phosphide constituent.

The p-n junction was formed by diffusing evaporated zinc covered by silver in a closed capsule. More particularly, the semiconductor surface of the hybrid material was masked and a .015-inch dot of 99.999% pure zinc, previously cleaned in dilute nitric acid and washed in distilled water and methanol, was evaporated on the conductive side. A .015-inch dot of 99.99% pure silver, previously cleaned in dilute nitric acid and washed in distilled water and methanol, was evaporated over the zinc. The crystalline material was then placed in a quartz capsule and evacuated to a pressure of less than $2\times10^{-5}$ millimeters mercury and sealed by shrinking the capsule around a solid quartz rod to maintain the volume in the evacuated region as small as practicable. The evacuated capsule was then heated at 500° C. for five minutes. On cooling to room temperature, it was found that the crystal exhibited contiguous n-type and p-type regions.

An ohmic contact was made to the n-side of the semiconductor crystal with an alloy of 50% tin and 50% indium. The surface of the hybrid semiconductor material was immersed in a small drop of molten indium-tin alloy on a quartz slab and fired for five minutes at a temperature of 400° C. in an argon atmosphere, followed by normal cooling to room temperature. The voltage intercept on the current-voltage characteristic, which approximates the barrier height across the p-n junction, corresponded to 2.5 to 2.6 electron volts, indicating a band gap for the mixed-crystal alloy of approximately 2.9 electron volts. On forward biasing of the diode, visible light emission peaking in a range of 2.1 to 2.2 electron volts (in the orange to yellow region of the visible spectrum) was obtained at room temperature. Despite the fact that the ratio of light output to power input was very low for the measured sample because the ohmic spreading resistance was found to be high as the result of a very small junction area, and although no attempt was made to improve the response by the use of activator impurities, an external quantum efficiency (i.e., ratio of photons produced to charge carriers injected) of approximately 1.5 to $2.5\times10^{-1}$ percent was obtained. Thus, the "self-activated" ZnS–GaP mixed crystal p-n junction diode was approximately 3 to 5 times more efficient on the basis of external quantum efficiency than that characteristic of the previously known visible-light room-temperature diodes (mixed-crystal GaAs–GaP diodes) operating below the extreme long-wavelength end of the visible spectrum. With material optimization and with deep level activator doping, external quantum efficiencies of from 1 to 20 percent or more may be expected.

As an example of preparation of a hybrid solid solution semiconductor material by halide transport vapor deposition in a closed capsule, a mixed crystal composed of 89.6 mole percent of cadmium sulfide and 10.4 mole percent of gallium arsenide as shown by X-ray fluorescence and diffraction analysis has been prepared in the following manner. A mixture containing 90 mole percent of cadmium sulfide and 10 mole percent of gallium arsenide was loaded in one end of a tubular quartz capsule of about 20 centimeters in length and 8 millimeters in diameter, which was then attached to a vacuum system. 50 milligrams of iodine were kept in a cold trap maintained at liquid nitrogen temperature and in communication with the capsule until a few moments before sealing off the capsule from the vacuum system. During the vacuum pumping operation, iodine was transported into the capsule in vapor phase by cooling the capsule and heating the cold trap. When a vacuum of approximately $2\times10^{-5}$ millimeters of mercury was attained, the capsule was sealed off and placed in a two-zone furnace to maintain the source end containing the cadmium sulfide/gallium arsenide mixture at a temperature of 1000° C. and the opposite end of the capsule at 800° C. for a period of 72 hours. Upon removal of the capsule from the furnace and cooling to room temperature, hybrid mixed crystals of n-conductivity type with a resistivity of the order of $5\times10^{-3}$ ohm centimeters were retrieved from the output end of the capsule. These crystals were of zincblende (cubic) lattice structure as confirmed by X-ray diffraction.

With an initial mixture of 99 mole percent cadmium sulfide and 1 mole percent gallium arsenide and identical processing, however, hexagonal crystals of n-conductivity type with a resistivity of from 1 to 5 ohm centimeters were produced. Analysis by X-ray fluorescence indicated that the composition of the solid solution crystals included nearly 1 mole percent of gallium and arsenic dissolved in the cadmium sulfide.

Conversion of both types (cubic and hexagonal) of cadmium sulfide/gallium arsenide crystals to p-conductivity type has been achieved by diffusion of zinc into the lattice structure. To achieve such conversion, the hybrid crystals are encapsulated in one end of a quartz capsule containing about 10 milligrams of zinc at the other end, and the capsule is evacuated to a pressure in the range of $2 \times 10^{-5}$ millimeters of mercury. After sealing off, the capsule is placed in a furnace to maintain the zinc end at 800° C. and the end with the hybrid crystals at 650° C. for a period of two hours. Hybrid crystals of p-type conductivity with a resistivity of less than 10 ohm centimeters have been produced in this manner.

Epitaxial deposition processes may also be employed advantageously to produce the hybrid solid solution materials useful in the light sources of the present invention. Epitaxial deposition permits concurrent control of both chemical composition and crystallography. Basically, such a process may make use of the known complex family for reversible chemical reactions between either a II–IV compound with a halogen or a Group III metal with a Group V halide to produce the halide of the Group II or Group III metal plus the elemental Group VI or Group V material, the direction of the reaction depending upon the ambient temperature. In essence, the high-temperature zone is spatially separated from the low-temperature zone and reaction products are transported from the high-temperature to the low-temperature zone by means of an inert or a reducing carrier gas.

More particularly, a substrate is situated in the lower temperature zone. The hybrid solid solution crystallizes or deposits on the substrate while the halide, having a lower boiling point, passes out of the furnace and settles on the cooler walls of the reaction tube. If the substrate is a slice of a single crystal with suitable orientation, crystal lattice structure and size, the depositing hybrid solid solution of III–V and II–IV compounds form a single-crystal film provided that the temperature and/or degree of super-saturation are favorable; the optimum conditions for each composition are best determined empirically. The use of carrier gases in epitaxial crystal growth processes is well known in the art, and the following specific example is given for illustrative purposes only.

Figure 3:
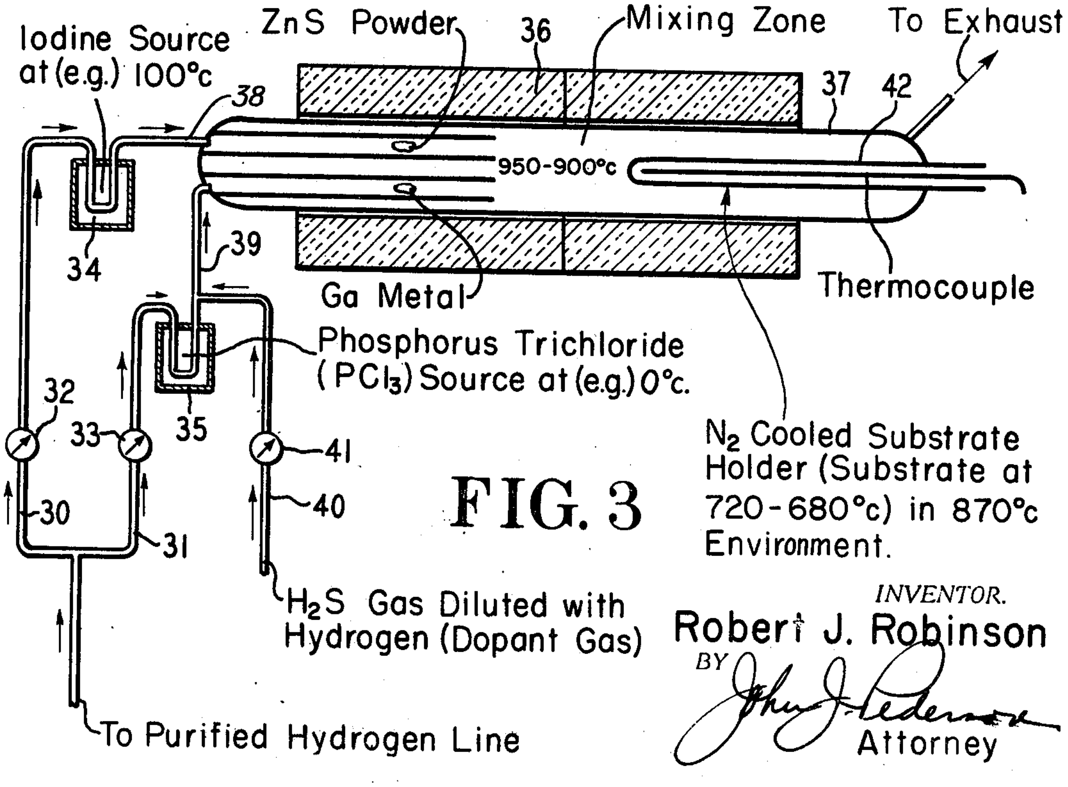
FIGURE 3 is a schematic view of an illustrative apparatus useful for growing hybrid crystals for use in the devices of FIGURES 1 and 2.

The apparatus used for epitaxial crystal growth is diagramatically shown in FIGURE 3. Hydrogen is employed as a carrier gas and supplied through two separate inlet lines 30 and 31 controlled by independent flow meters 32 and 33 respectively. Halogen or halide sources 34 and 35 are associated with inlet lines 30 and 31 respectively, source 34 providing iodine at approximately 100° C. and source 35 supplying phosphorus tri-chloride at approximately zero degrees centigrade. When hydrogen flows through either of the two sources 34 and 35, it picks up iodine or phosphorus tri-chloride vapor respectively and carries it into the hot zone of a furnace 36 containing a quartz tube 37. The left-hand zone of the furnace is the hot zone and is maintained at approximately 980° C., while the right-hand portion is the cold zone and is maintained at approximately 870° C. Within the quartz tube, in the hot zone, the source materials (which may be zinc sulfide and gallium metal for example) are spatially separated and associated with the respective inlet lines 38, 39 associated with sources 34 and 35 respectively. Hydrogen sulfide gas diluted with hydrogen from an inlet line 40 and flowing through a flow meter 41 is supplied to supply line 39 between halide source 35 and the gallium metal in the quartz tube in the hot zone end of the furnace. The amount of iodine or phosphorus tri-chloride carried by a unit volume of hydrogen gas depends upon the temperatures of the halogen and halide sources.

In the hot zone of furnace 36, iodine vapor carried by hydrogen and injected through supply line 38 reacts with zinc sulfide to produce zinc iodide and elemental sulfur. The elemental sulfur in turn may react with the hydrogen carrier gas to form hydrogen sulfide, although this reaction is probably only partial at the high temperatures involved. Phosphorus tri-chloride injected by supply line 39 reacts with the elemental molten gallium to produce gallium chloride plus elemental phosphorus and possibly other reaction products.

An the other end of quartz tube 37 in the cold zone of the furnace 36, there is provided a nitrogen-cooled substrate holder 42 which is maintained in the temperature range from 680 to 720 degrees centigrade in the 870° C. environmental temperature at the cold-zone end of the furnace. The temperature in the mixing zone between the source materials and the substrate is in the range from 900 to 950 degrees centigrade. The reaction products of the chemical reactions of the iodine and phosphorus tri-chloride vapors with zinc sulfide and gallium, respectively, enter and traverse the mixing zone of the reaction tube 37 and by the time they reach the substrate the mixing is sufficiently complete that a homogeneous mixed crystal of gallium phosphide and zinc sulfide is produced epitaxially. The zinc iodide and sulfur react at the lower temperature to form the zinc sulfide, and gallium phosphide is formed by the reaction between phosphorus and gallium chloride. As a substrate, a melt-grown gallium phosphide single crystal may be employed. Crystal growth is best on the (111 cubic face, and crystal formation takes place in a temperature range from 750 to 680 degrees centigrade.

While the hybrid solid solution semiconductor materials described herein may be employed to produce spontaneous emission of visible light at substantially improved efficiency as compared to those obtainable with previously known semiconductor diode light source at comparable wavelengths, on the basis of conduction band- or donor-to-deep-acceptor radiative transitions which have been found to strongly predominate in such hybrid materials, a still further improvement in both quantum efficiency and energy conversion efficiency may be obtained by the use of deep level dopants to act as activators in conjunction with shallow level dopants as compensating co-activators. For example, a hybrid solid solution of ZnS or ZnS and CdS with GaAs or GaP may be doped with minor proportions of silver chloride to enhance the predominance of radiative over non-radiative transitions. The use of such activators is well known and understood in connection with zinc sulfide and ZnS–CdS cathodo-luminescent phosphors, and analogous considerations are applicable in the use of such activators to enhance the efficiencies of the hybrid solid solution materials employed in accordance with the present invention. In general, those dopants useful as activators or co-activators in connection with the ZnS and ZnS–CdS cathodo-luminescent phosphors may be employed, in comparable proportions and with comparable effect, to optimize the efficiencies of the hybrid semiconductor diode materials. The deep level activator dopants may be introduced either before or after formation of the p-n junction. With the use of deep level acceptor dopants as activators, in conjunction with shallow level co-activator doping, external efficiencies of from 1 to 20 percent or even more may be attained at any visible light wavelength.

From the results obtained with experimental injection diodes formed of the hybrid III–V/II–VI materials, the output photons are apparently produced by deep defect emission similar to the well known zinc sulfide and cadmium sulfide cathodoluminescent phosphor emission which are roughly 0.8 to 1.0 electron volts lower than the respective band gaps of these materials. It is of course known that zinc sulfide, cadmium sulfide and solid solutions of the two may be employed to obtain commercially useful cathodo-luminescence emission throughout the visible spectrum by varying the proportions of the zinc and cadmium sulfides in the solid solution. In the same manner, instead of employing a single II–VI compound in a hybrid alloy with a III–V compound, ternary hybrid alloys such as a solid solution of ZnS and CdS with GaP or GaAs, all of which are isomorphous with sufficiently matched lattice constants and all of which are characterized by band gap energies in or near the visible or larger range, may be used. By varying the relative concentrations of zinc sulfide and cadmium sulfide in such a ternary mixed-crystal alloy, and be employing both shallow and deep level impurities, radiative transitions at any desired wavelength within the visible range, even in the blue or short-wavelength portion of the spectrum, may be achieved. The quantum and power efficiencies obtainable are much greater than those previously obtained with semiconductor-diode light sources at comparable wavelengths, and even at room temperature may attain or even exceed the efficiencies obtained with present-day cathodoluminescent television phosphors. Other hybrid solid solution semiconductor materials which may be useful in achieving the objectives of the present invention include, for example, CdS–GaP, CdS–GaAs, ZnS–GaAs, ZnS–CdS–GaP–GaAs, and Sne–ZnTe–GaP. Each of these ZnS–CdS–GaP–GaAs, and ZnSe–ZnTe–GaP. Each of these and other hybrid materials may emit photons within the visible or near-infrared ranges by spontaneous emission on radiative transitions in response to forward biasing of a p-n junction.

In accordance with another aspect of the invention, a new and improved semiconductor injection laser is provided for achieving stimulated emission of coherent light within the visible spectrum at ordinary room temperatures. In a semiconductor diode embodying the hybrid alloy of the present invention, operation in the stimulated emission or lasing mode may also be achieved at room temperature, simply by sufficiently increasing the injected current until lasing is obtained. In this mode, however, as contrasted with the spontaneous emission mode, band-to-band or nearly band-to-band transitions rather than deep defect emissions seem to be predominant, and a given diode typically lases at a shorter wavelength than that of spontaneous emission from the same diode operated with a lower injection current. As in the case of spontaneous emission operation, however, the particular wavelength of the emitted radiation is dependent upon the constituent proportions of the II–VI compound and the III–V compound ingredients in the solid solution. Thus, it is possible to produce an injection semiconductor laser for producing coherent light at room temperature at any desired wavelength in the visible spectrum. Although the II–VI semiconductor compounds of zincblende structure are all direct-gap materials, while the widerband III–V compounds (GaP and AlSb) are indirect-gap materials, solid solutions or alloys of these materials may nevertheless be formed; however, the hybrid solid solution or alloy retains direct-gap properties only for II–VI compound concentrations above a predetermined limit which is dependent on the constituents selected and may be empirically determined for any selected alloy composition. Room temperature internal quantum efficiencies approaching 100% in the lasing mode may be achieved with readily achievable injection current densities.

Figure 2:
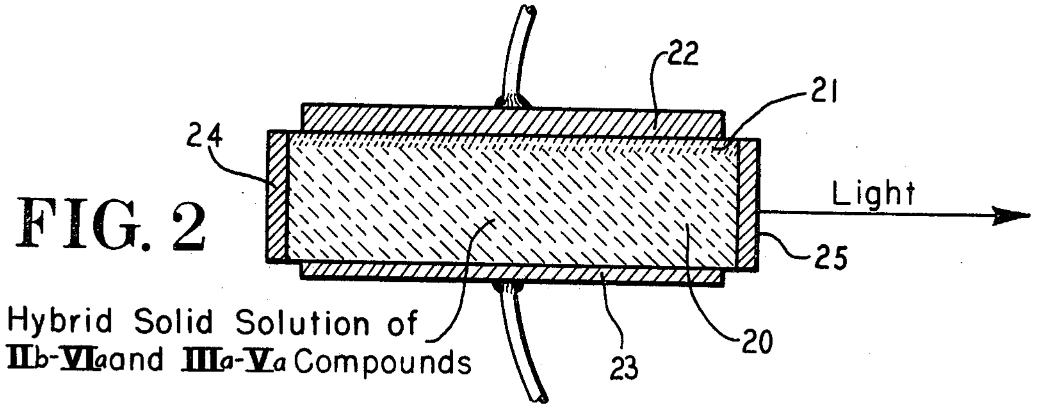
FIGURE 2 is a schematic cross-sectional view of a semiconductor injection laser beam embodying the invention.

FIGURE 2 illustrates a semiconductor diode light source specifically adapted for operation in the stimulated emissionor lasing mode. In FIGURE 2, the n-type semiconductive hybrid crystal 20 is doped to provide a p-conductivity zone 21 which extends across the entire upper surface, a conductive element 22 being in ohmic contact with p-conductive zone 21. The ohmic contact 23 to the n-conductive zone 20 extends across the entire bottom surface of the crystalline substrate. A totally reflecting mirror 24 and a partially transmissive mirror 25 are provided at opposite surfaces of the diode; in practice, mirrors 24 and 25 may be discrete elements, although their function may be provided in whole or in part by opposite parallel flat surfaces formed by crystal cleavage along predetermined parallel crystal planes. To obtain operation in the stimulated emission mode, the p-n junction between zones 20 and 21 is forward biased with a much higher current density than that employed to obtain such a device operating in the lasing mode is coherent spontaneous emission operation. The light output from emission and outwardly directed in a plane parallel to that of the p-n junction between zones 20 and 21, and of a shorter wavelength than that produced by the same device in the spontaneous emission mode; the output photons in the lasing mode are produced by edge emission, i.e., of a wavelength nearly equal to that corresponding to the band gap of the material employed.

Of course it is contemplated that known techniques and expedients for optimizing the energy conversion efficiences of recombination light sources operating in either the spontaneous emission or the stimulated emission mode may be employed in conjunction with the semiconductor diode light sources of the present invention. Known expedients for minimizing the reflection at the exit surface as well as for reducing energy adsorption of the electrodes and self-adsorption in the material are desirably employed to improve the external efficiency. The resistivity of the p-type and n-type zones and the abruptness of the p-n junction of course also influence the external efficiency of the device, and optimum results are achieved with minimum resistivity and greatest obtainable abruptness of the junction. While the minority carrier injection is preferably achieved by the use of a forward-biased p-n- junction in such a hybrid solid solution material, other injection mechanisms such as internal field emission or avalanche multiplication across a reverse-biased junction may be employed.

While the invention has been described primarily with emphasis on the production of visible light at ordinary room temperatures, it is of course to be understood and appreciated that hybrid solid solutions of the type herein described may be advantageously employed in the production of semiconductor light sources to be operated in other temperature ranges, such as a liquid nitrogen or cryogenic temperatures, or for the production of infrared light or ultraviolet radiation. In such applications, the primary advantage of the invention may reside in improved external efficiencies as compared with those characteristics of previously known semiconductor light source materials, or in the development of light at wavelengths not literally or conveniently attainable with other materials, or both.

Thus the invention provides a new and improved semiconductor diode light source for efficiently producing at room temperature output photons in the visible light wavelength range by radiative recombination of electron-hole pairs in a hybrid solid solution or alloy comprising both II–VI and III–V semiconductor compounds. Quantum efficiencies greatly exceeding those previously achieved with semiconductor diode light sources are obtainable at room temperatures, and the wavelength of the emitted photons may be established in different portions of the visible spectrum as determined by the proportions of the constituent compounds in the hybrid solid solution and by the use of selected donor and acceptor impurity dopants. High efficiency operation of semiconductor diode light sources in a lasing or stimulated emission mode, as well as in a spontaneous emission mode, may be achieved.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A semiconductor light source comprising:
a crystalline semiconductive base comprising a hybrid solid solution of II*b*–VI*a* and III*a*–V*a* compounds;
and asymmetrically conductive means for injecting minority charge carriers into said base.

2. A semiconductor light sourse as in claim 1, in which said asymmetrically conductive means for injecting minority charge carriers into said base includes a p-n- junction therein.

3. A semiconductor light source as in claim 2, in which said asymmetrically conductive means for injecting minority charge carriers into said base further comprises means for forward biasing said p-n junction.

4. A light source as in claim 1, in which said semiconductive base is a mixed-crystal solid solution of isomorphous II*b*–VI*a* and III*a*–V*a* compounds.

5. A light source as in claim 1, in which said solid solution is constituted essentially of at least one II*b*–VI*a* compound from the group consisting of zinc sulfide and cadmium sulfide and at least one III*a*–V*a* compound from the group consisting of gallium phosphide and gallium arsenide.

6. A light source as in claim 2, in which said p-n junction comprises a first region of said base doped with donor impurity atoms of a Group VI*a* element and a second region of said base doped with acceptor impurity atoms of a Group II*b* element.

7. A light source as in claim 6, in which said donor atoms are of sulfur or selenium and said acceptor atoms are of zinc or cadmium.

8. A light source as in claim 6, in which said acceptor impurity atoms are of the same Group I*b* element as a Group II*b* constitutent of said hybrid solid solution.

9. A light source as in claim 6, in which said donor and acceptor atoms are of elements corresponding to elemental components of a II*b*–VI*a* compound constituent of said hybrid solid solution.

10. A light source as in claim 1, in which said hybrid solid solution is a binary alloy of a single II*b*–VI*a* compound and a single III–V compound.

11. A light source as in claim 1, in which said hybrid solid solution is a ternary alloy of a pair of II*b*–VI*a* compounds and a single III*a*–V*a* compound.

12. A light source as in claim 11, in which said II*b*–VI*a* compoundst are zinc sulfide and cadmium sulfide.

13. A light source as in claim 1, in which said hybrid solid solution is a mixed-crystal material of zincblende lattice configuration.

14. A light source as in claim 1, in which said hybrid solid solution is of hexagonal crystal lattice configuration.

15. A light source as in claim 3, in which said hybrid solid solution is doped with a deep-level acceptor impurity.

16. A semiconductor light source as in claim 2, in which said junction is forward-biased to provide spontaneous emission by radiative recombination of majority and minority carriers in said semiconductive base.

17. A semiconductor light source as in claim 2, in which said junction is forward-biased to provide stimulated emission of coherent light.

18. A semiconductor diode light source for providing visible light emission at normal room temperature ranges comprising a crystalline semiconductive base composed of a hybrid solid solution of at least one II*b*–VI*a* compound with another constituent comprising an isomorphous compound of a Group III*a* metal, said solid solution having a predetermined lattice configuration with some metal atom sites occupied by Group II*b* metal atoms and others by Group III*a* metal atoms, and said crystalline base including a first zone doped with a donor impurity to provide efficient n-type conductivity;
said crystalline base including a second zone in which some of the metal atom sites in the lattice structure are occupied by atoms of an acceptor element to establish a p-n junction in said crystalline base;
and separate electrically conductive means including ohmic contacts connected respectively to said first and second zones for forward biasing said p-n junction to inject minority charge carriers into said base.

19. A semiconductor light source as in claim 18, in which said other constituent of said hybrid solid solution is a III*a*–V*a* compound and said acceptor element is a Group II element which replaces metal atoms of said III*a*–V*a* compound in said lattice structure.

20. A semiconductor light source as in claim 18, in which said hybrid solid solution is composed of II*b*–VI*a* and III–V compounds and is doped with a deep-level activator impurity and a shallow-level compensating coactivator impurity.

21. A semiconductor light source as in claim 20, in which said hybrid solid solution is composed of zinc sulfide, cadmium sulfide and at least one of the group consisting of gallium arsenide and gallium phosphide.

22. A semiconductor light source comprising:
a crystallographically homogeneous continuum of semiconductor material of which only a portion is of p-type conductivity, at least said portion being composed of a p-doped hybrid solid solution of II*b*–VI*a* and III*a*–V*a* compounds;
and means for effecting electron-hole recombination in a part of said continuum other than said p-conductivity portion.

23. A semiconductor light source comprising:
a crystalline continuum of semiconductor material of which only a portion is of p-type conductivity, at least said portion being composed of a hybrid solid solution of at least one II*b*–VI*a* compound with another constituent comprising an isomorphous compound of a Group III*a* metal, said solid solution having a predetermined lattice configuration with some metal atom sites occupied by Group II metal atoms and others by Group III*a* metal atoms;
and means for effecting electron-hole recombination in a part of said continuum other than said p-conductivity portion.

24. A semiconductor light source according to claim 23, in which p-type conductivity in said portion is provided by diffusion of Group II*b* metal atoms for Group III*a* metal atoms in the lattice structure of said solid solution.

25. A semiconductor light source according to claim 23, in which said continuum further comprises an n-type conductivity portion comprising a II*b*–VI*a* compound of the same composition as a constituent of said solid solution.

References Cited

UNITED STATES PATENTS

| | | | |
|---|---|---|---|
| 3,309,553 | 3/1967 | Kroemer | 313—108 |
| 3,374,176 | 3/1968 | Potter | 317—235 X |
| 3,377,529 | 4/1968 | Weiss | 317—237 |
| 3,415,989 | 12/1968 | Leventhal et al. | 317—235 X |
| 3,427,211 | 2/1969 | Foster et al. | 317—234 X |

JAMES D. KALLAM, Primary Examiner

U.S. Cl. X.R.

317—234